(No Model.)
E. S. HUNTER.
CHAIN PIPE WRENCH.
No. 541,166. Patented June 18, 1895.
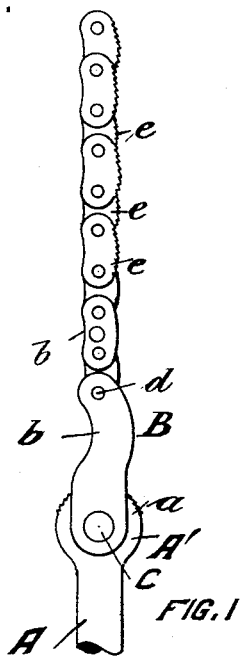
FIG.1
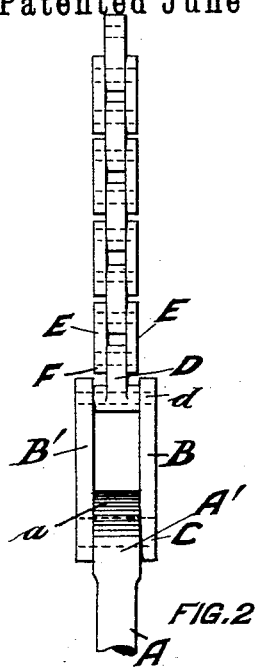
FIG.2
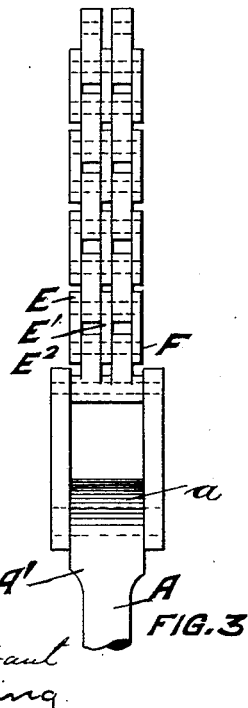
FIG.3
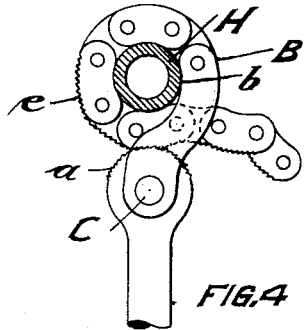
FIG.4
Witness:
E. H. Sturtivant
A. S. Büsing
Inventor:-
Edward Spencer Hunter,
by 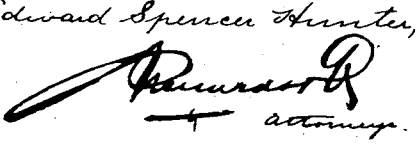
attorney.

UNITED STATES PATENT OFFICE.

EDWARD SPENCER HUNTER, OF NORTH SHIELDS, ENGLAND.

CHAIN PIPE-WRENCH.

SPECIFICATION forming part of Letters Patent No. 541,166, dated June 18, 1895.

Application filed March 6, 1895. Serial No. 540,710. (No model.) Patented in England January 26, 1891, No. 1,401.

*To all whom it may concern:*

Be it known that I, EDWARD SPENCER HUNTER, a citizen of Great Britain, residing at 26 Coburg Street, North Shields, England, have invented a new and useful Chain Pipe-Wrench, (for which I have obtained a patent in Great Britain, No. 1,401, dated January 26, 1891,) of which the following is a specification.

This invention relates to an improved method of constructing pipe wrenches and spanners the object being to produe a wrench capable of gripping and securely holding various sizes of pipes or rods or for enabling nuts or bolts to be held and operated upon by means of a spanner having series of links or chain plates to form the encircling and inclosing jaw.

In the accompanying sheets of explanatory drawings, Figure 1 is a side elevation of my improved tool, showing the handle or lever end broken off; and Fig. 2 is an edge elevation of the same. Fig. 3 is an edge elevation or plan of my wrench when formed with five link-plates, and Fig. 4 is a side elevation showing my wrench in position when gripping a tube.

I make the lever A of metal having its outer end formed suitable for a handle or made to receive a loose handle casing, while its head or inner surface end A' I make with a serrated or rack like outer surface a. Upon the head A' I carry a pair of flat link plates B, B', pivoted upon the pin C passing through the head. I curve the inner surfaces of these links at b to form a bed for the tube or bar H to rest against. At the outer end of the links B B' I attach a connecting link bar or crosshead D by means of a rivet or pin d and to this single bar or link I attach other links or plates E, E', E², as shown in Figs. 2 and 3 by means of rivets or pins F, thus making a length of chain which when placed round the pipe nut or object to be operated upon, can be tightened by means of the serrated edge or rack like teeth upon the head of the handle.

I prefer to form some of my links with their outer edges e serrated to suit the serrations or teeth upon the head of the lever as shown in Figs. 1 and 4.

When constructing my wrenches for use upon pipes and circular articles I make the inner surfaces curved to give a better grip to the chain jaw; but when making my spanner suitable for operating upon nuts or the like I may make the inner surfaces flat so that they may rest upon the flat sides of the nut or like article.

I sometimes make my lever end A', with its outer surface a formed somewhat eccentric with the pin c so that the links may be forced upon the pipe or nut by the wedge like action of the head and thus a grip to be obtained without providing serrated teeth upon the outer meeting edges of the link and the lever head.

I make my wrenches of any desired width, altering the number of plates and links to suit any particular requirement and I sometimes roughen the inner surfaces to increase the gripping action.

Having now particularly described and ascertained the nature of my said invention, I declare that what I claim is—

1. In combination the handle having the enlarged head, the link plates B B' on each side thereof, the connecting piece D between the plates, the links connected with said cross piece, a series of said links being adapted to be acted upon in succession by the head and adapted severally to pass between the link plates, substantially as described.

2. In combination, the handle having the enlarged head, the link plates B B' on each side thereof, the cross piece connecting the link plates, the links connected with said cross piece, a series of said links having serrations to be engaged directly by serrations on the head, said links being arranged to pass between the link plates, substantially as described.

In witness whereof I have hereunto set my hand in presence of two witnesses.

EDWARD SPENCER HUNTER.

Witnesses:
JOHN HUNTER,
GEORGE WATSON.